US011700796B2

(12) United States Patent
Yang et al.

(10) Patent No.: US 11,700,796 B2
(45) Date of Patent: *Jul. 18, 2023

(54) METHOD OF RAPID GENERATION-ADDING BREEDING OF RICE

(71) Applicant: INSTITUTE OF URBAN AGRICULTURE, CHINESE ACADEMY OF AGRICULTURAL SCIENCES, Sichuan (CN)

(72) Inventors: Qichang Yang, Beijing (CN); Zhonghua Bian, Jining (CN); Zonggeng Li, Jinan (CN); Sen Wang, Chengdu (CN); Wei Lu, Chengdu (CN); Chengbo Zhou, Xinyang (CN)

(73) Assignee: INSTITUTE OF URBAN AGRICULTURE, CHINESE ACADEMY OF AGRICULTURAL SCIENCES, Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,065

(22) Filed: Aug. 8, 2022

(65) Prior Publication Data

US 2023/0141073 A1    May 11, 2023

Related U.S. Application Data

(63) Continuation of application No. 17/582,177, filed on Jan. 24, 2022, now Pat. No. 11,406,064.

(30) Foreign Application Priority Data

Nov. 5, 2021   (CN) .......................... 202111305500.2

(51) Int. Cl.
*A01G 2/00*    (2018.01)
*A01G 7/04*    (2006.01)
(Continued)

(52) U.S. Cl.
CPC ................. *A01G 7/045* (2013.01); *A01C 1/02* (2013.01); *A01D 45/04* (2013.01); *A01G 2/00* (2018.02); *A01G 22/22* (2018.02)

(58) Field of Classification Search
CPC . A01G 2/00; A01G 7/04; A01G 7/045; A01G 9/249
(Continued)

(56) References Cited

U.S. PATENT DOCUMENTS 6,277,814 B1 *   8/2001   Qiu .......................... A01N 63/50
                                              504/117
6,309,440 B1 *  10/2001   Yamashita ............... A01G 7/06
                                              71/30
(Continued)

FOREIGN PATENT DOCUMENTS

CN          1262031 A      8/2000
CN        203322990 U     12/2013
(Continued)

OTHER PUBLICATIONS

Liu, Xiaoying et al., The Effect of Red and Blue LED on Photo Morphogenesis of Rice Seedlings, China Illuminating Engineering Journal, 24: 162-167, 2013.
(Continued)

*Primary Examiner* — David J Parsley

(57) ABSTRACT

The invention discloses a method of rapid generation-adding breeding of rice in the technical field of rice breeding, including soaking seeds of the rice, germination, seedlings cultivation, managing and regulating of the rice at the growth stage, and harvesting the rice. The managing and regulating the rice at the growth stage includes dynamic light quality and photoperiod control in vegetative growth period, heading period and pustulation period; growth period involves light environment regulation with the ratio of red light:blue light:white light of 0.8-1:0.8-1:1.0, photo-
(Continued)

period of 16-18 h; heading period involves light environment regulation with the ratio of red light:blue light:white light of 1-2:0.5-1:1, photoperiod of 12-13.5 h; and pustulation period includes light environment regulation with the ratio of red light:blue light:white light of 1-2:1:1, photoperiod of 16-18 h.

8 Claims, 1 Drawing Sheet

(51) Int. Cl.
    *A01G 22/22*           (2018.01)
    *A01C 1/02*            (2006.01)
    *A01D 45/04*           (2006.01)

(58) Field of Classification Search
    USPC ........... 47/1.01 R, 58.1 R, 58.1 LS, 58.1 SE, 47/58.1 FV
    See application file for complete search history.

(56) References Cited

U.S. PATENT DOCUMENTS

| | | | |
|---|---|---|---|
| 7,818,916 | B2 | 10/2010 | Bissonnette et al. |
| 8,991,098 | B2 | 3/2015 | Lejeune et al. |
| 2009/0272029 | A1 | 11/2009 | Aiking et al. |
| 2010/0154299 | A1 | 6/2010 | Kobayashi et al. |
| 2013/0047505 | A1* | 2/2013 | Ng ........................ A01N 43/08 47/58.1 SE |
| 2013/0255150 | A1 | 10/2013 | Karpinski et al. |
| 2014/0165462 | A1 | 6/2014 | Shigyo et al. |
| 2014/0215914 | A1 | 8/2014 | Takeuchi |
| 2015/0128488 | A1 | 5/2015 | Casper et al. |
| 2015/0230409 | A1 | 8/2015 | Nicole et al. |
| 2016/0000018 | A1 | 1/2016 | Van Elmpt et al. |
| 2016/0150745 | A1 | 6/2016 | Chen et al. |

FOREIGN PATENT DOCUMENTS

| | | |
|---|---|---|
| CN | 110839522 A | 2/2020 |
| CN | 111357551 A | 7/2020 |
| CN | 111418463 A | 7/2020 |
| CN | 112544422 A | 3/2021 |

OTHER PUBLICATIONS

Qu, Cheng et al., Effects of LED Red and Blue Light Ratio on Growth and Physiological Characteristics of Rice Seedlings, Journal of Nuclear Agronomy Sciences, 34(9): 2095-2102, 2020.

Fu, Chuan-Ming et al., Effects of Different Light Quanlities and Illumination Supplement on Growth and Photosynthetic Rate of Rice Seedling, Guangxi Plants, 27: 255-259, 2007.

Yang, Anzhong, Practical Techniques for High Rice Yield, Anhui University Press, 2014, 8 pages.

Zhejiang Agricultural Cadre School, Knowledge of Agricultural Science and Technology, Zhejiang Science and Technology Publishing House, 1985, 12 pages.

First Office Action in Chinese Application No. 202111305500.2 dated Aug. 23, 2022, 21 pages.

\* cited by examiner

METHOD OF RAPID GENERATION-ADDING BREEDING OF RICE

CROSS-REFERENCE TO RELATED APPLICATIONS

This application is a continuation of U.S. Ser. No. 17/582,177, filed on Jan. 24, 2022, which claims priority to Chinese Patent Application No. 202111305500.2, filed on Nov. 5, 2021, the contents of which are hereby incorporated by reference.

TECHNICAL FIELD

The invention relates to the technical field of rice breeding, and in particular to a method of rapid generation-adding breeding of rice.

BACKGROUND

Rice is the third largest food crop in the world. The cultivation of high-quality seeds of the rice is the key to ensure the yield and quality of rice. At present, there are two common methods of rice breeding. One is conventional cross self-breeding, the crop obtains stable traits after repeated cross-selfing, and high-quality rice varieties are cultivated. The other is transgenic breeding, which realizes the improvement at the gene level by means of transgene and then stabilizes the rice varieties with excellent traits. Due to the limitation of regional climatic conditions, conventional rice breeding can only add 2-3 generations a year, and it often takes several years or even ten years to cultivate a high-quality rice variety. Transgenic breeding, has the advantage of a relatively short breeding cycle, and the target variety is usually obtained after 1-2 times of cultivation. However, considering the food security problem, the conventional breeding method with a long cycle is generally adopted for rice as a food crop, which is difficult to meet the market demand for high-quality seed sources in rice planting. Therefore, there is an urgent need for a fast and safe breeding method to resolve the current problems of rice breeding.

SUMMARY

The purpose of the invention is to provide a method of rapid generation-adding breeding of rice to solve the above-mentioned problems existing in the prior art, which provides technical support for realizing rapid cultivation of high-quality rice varieties in limited land area, shortening the conventional breeding cycle and ensuring food security by accurately regulating the dynamic light quality and photoperiod environment in rice growth periods.

To achieve the above objective, the invention provides the following scheme:

the invention provides a method of rapid generation-adding breeding of rice, which includes soaking seeds of the rice, germination, seedlings cultivation, managing and regulating of the rice at the growth stage and harvesting the rice, wherein the managing and regulating of the rice at the growth stage includes regulation of dynamic light quality and photoperiod environment during vegetative growth period, heading period and pustulation period of the rice; wherein the regulation during the vegetative growth period includes: cultivating under the Deep Flow Technology condition of the mixed light emitting diode (LED) light source with the ratio of red light:blue light:white light of 0.8-1:0.8-1:1.0, the photoperiod of 16-18 h and additional Hoagland nutrient solution with 5%-10% of calcium nitrate;

the regulation during the heading period includes: cultivating under the soilless cultivation technology condition of the mixed LED light source with the ratio of red light:blue light:white light of 1-2:0.5-1:1, photoperiod of 12-13.5 h and additional Hoagland nutrient solution with 5%-15% of dipotassium hydrogen phosphate (Deep-Flow Technology, DFT; Aeroponics); and the regulation during the pustulation period includes: cultivating under the soilless cultivation technology condition of the mixed light source with the ratio of red light:blue light:white light of 1-2:1:1, photoperiod of 16-18 h and additional Hoagland nutrient solution with 5%-10% of dipotassium hydrogen phosphate (Deep-Flow Technology, DFT; Aeroponics); wherein the wavelength of red light is 660 nm, the wavelength of blue light is 450 nm, and the wavelength of white light is 400-700 nm.

Preferably, the illumination intensity at vegetative growth period, heading stage and pustulation period is set to 200-300 $\mu mol\ m^{-2}\ s^{-1}$, 350-450 $\mu mol\ m^{-2}\ s$ and 500-700 $\mu mol\ m^{-2}\ s^{-1}$, respectively.

Preferably, soaking seeds of the rice includes: selecting pest-free seeds of the rice with full grains, cleaning and soaking seeds for 12-24 h.

Preferably, germination means culturing the seeds of the rice after soaking at 22-25° C. in dark for 36-48 h.

Preferably, seedling growing means culturing germinated seeds of the rice in a mixed light source with red light:blue light of 2-5:1, illumination intensity of 100-150 $\mu mol\ m^{-2}\ s^{-1}$, and photoperiod of 14-18 h.

Preferably, during the vegetative growth period, the seedlings are transplanted and grown under the soilless cultivation technology condition of the mixed light source with the ratio of red light:blue light:white light of 0.8-1:0.8-1:1.0, the photoperiod of 16-18 h, illumination intensity of 200-300 $\mu mol\ m^{-2}\ s^{-1}$ and the addition of Hoagland nutrient solution with 5%-10% of calcium nitrate (Deep-Flow Technology, DFT; Aeroponics);

Preferably, before harvesting, the day/night temperature of rice breeding is (27-30° C.)/(23-25° C.), and the air relative humidity is set at 65-85%.

Preferably, harvesting means mature rice ears are harvested, threshed, and treated for 5-7 days under air temperature 28-30° C., air humidity less than 40% and good ventilation, and the water content of seeds is reduced to 6%-13% and then the seeds are stored at low temperatures.

Preferably, the low temperature is 0-4° C.

The invention discloses the following technical effects:

Based on the features of rice growth period, the invention accurately regulates and controls the dynamic light quality, photoperiod, day/night temperature, relative air humidity, nutrition supply and other environmental factors, and provides a method of rapid generation-adding breeding of rice. The method scientifically and reasonably shortens the growth period of rice, realizes quick harvest about 60 days after planting, shortens the growth period of conventional rice about 120 days by half, and is expected to achieve 5-6 crops a year. Under the management conditions of specific light environment, day/night temperature, relative air humidity, nutrition supply and other environmental factors in the plant factory, the rice can grow faster, blossom early and grow seeds quickly. Specifically, rice seedling cultivation should be taken around 7 days after sowing and it takes about 38-47 days from transplanting to heading, while harvesting is around 53-65 days after sowing. The yield per unit area of a single layer is 0.81-1.2 kg (average 0.98 kg), which is equivalent to 540.3-800.4 kg (average 653 kg) per mu (1 mu=666.67 m$^2$). Therefore, the invention provides a brand-new and effective method of rapid generation-adding breeding under the controllable environmental conditions of plant factory, provides technical support for realizing rapid cultivation of high-quality rice varieties in limited land area, shortening the conventional breeding cycle and ensuring food security, and can meet a large number of market demands for high-quality rice seed sources.

BRIEF DESCRIPTION OF THE FIGURES

In order to more clearly explain the embodiments of the invention or the technical solutions in the prior art, the drawings needed in the embodiments will be briefly introduced below. Obviously, the drawings in the following description are only some embodiments of the invention, and for ordinary technicians in the field, other drawings can be obtained according to these drawings without creative efforts.

DETAILED DESCRIPTION OF THE EMBODIMENTS

Figures 1A, 1B:
FIGS. 1A and 1B are images of heading and fruiting of rice in Embodiment 1, respectively.

Various exemplary embodiments of the invention will be described in detail below. This detailed description should not be considered as a limitation of the invention, but should be understood as a more detailed description of some aspects, features and embodiments of the invention.

It should be understood that the terms used in this invention are only for describing specific embodiments, and are not used to limit the invention. In addition, for the numerical range in the invention, it should be understood that each intermediate value between the upper limit and the lower limit of the range is also specifically disclosed. Any stated value or intermediate value within the stated range and any other stated value or every smaller range between intermediate values within the stated range are also included in the invention. The upper and lower limits of these smaller ranges can be independently included or excluded from the range.

Unless otherwise specified, all technical and scientific terms used herein have the same meaning as commonly understood by the ordinary technicians in the field of this invention. Although the invention only describes the preferred methods and materials, any methods and materials similar or equivalent to those described herein can also be used in the practice or testing of the invention. All documents mentioned in this specification are incorporated by reference to disclose and describe the methods and/or materials related to the documents. In case of conflict with any incorporated documents, this specification shall prevail.

Without departing from the scope or spirit of the invention, it is obvious to those skilled in the art that many modifications and changes may be made to the specific embodiments of the invention. Other embodiments obtained from the description of the invention will be obvious to the skilled person. The specification and Embodiments of this application are exemplary only.

The words "including", "comprising", "having" and "containing" used in this invention are all open terms, that is, they mean including but not limited to.

In some embodiments, the method of rapid generation-adding breeding of rice can at least include soaking seeds of the rice, germination, seedling cultivation, managing and regulating of the rice at the growth stage and harvesting. The managing and regulating of the rice at the growth stage includes the regulation of dynamic light quality and photoperiod environment in vegetative growth period, heading period and pustulation period. For example, in the growth management period, according to the mixed light source with the ratio of red light (660 nm):blue light (450 nm):white light (400 nm) of 1:1:1, the photoperiod is 16 h, the illumination intensity is 450 µmol m$^{-2}$ s$^{-1}$, the day and night temperatures are 30° C. and 25° C. respectively, the air humidity is 85%, and Hoagland nutrient solution with 15% potassium hydrogen phosphate ($K_2HPO_4$) is used for soilless cultivation. Heading 45 days after sowing, harvesting 63 days after sowing, the single-layer yield per unit area is 566.7 kg/mu, the plant height is 77.5 cm, the number of tillers is 28.8, the number of grains is 118.3, the fresh weight overground is 40.5 g, the dry weight overground is 12.6 g, the underground fresh weight is 33.7 g, the underground dry weight is 7 g, the maturing rate is 71.3%, and the grain-straw ratio is 0.67.

In some embodiments, soaking seeds of the rice means selecting seeds of the rice with full grains, cleaning and soaking them for 12-14 h.

In some embodiments, sprouting means culturing seeds of the rice after soaking at 22-25° C. in dark for 36-48 h.

In some embodiments, seedling growing means culturing the germinated seeds of the rice in a mixed light source with red light:blue light of 2-5:1, illumination intensity of 100-150 µmol m$^{-2}$ s$^{-1}$, and photoperiod of 14-18 h.

In some embodiments, the regulation during the vegetative growth period includes adding Hoagland nutrient solution with 5%-10% of calcium nitrate to carry out soilless culture under the conditions of mixed light source with the ratio of red light:blue light:white light of 0.8-1:0.8-1:1.0, photoperiod of 16-18 h and illumination intensity of 200-300 µmol m$^{-2}$ s$^{-1}$.

In some embodiments, regulation during the heading period means adding Hoagland nutrient solution with 5%-15% of dipotassium hydrogen phosphate to carry out soilless culture under the conditions of mixed light source with the ratio of red light:blue light:white light of 1-2:0.5-1:1, photoperiod of 12-13.5 h and illumination intensity of 350-450 µmol m$^{-2}$ s$^{-1}$.

In some embodiments, the regulation during the pustulation period includes adding Hoagland nutrient solution with 5%-15% of dipotassium hydrogen phosphate to carry out soilless culture under the conditions of mixed LED light source with the ratio of red light:blue light:white light of 1-2:1:1, photoperiod of 16-18 h and illumination intensity of 500-700 µmol m$^{-2}$ s$^{-1}$.

In some embodiments, the wavelength of red light is 660 nm, the wavelength of blue light is 450 nm, and the wavelength of white light is 400-700 nm.

In some embodiments, the daytime/night time temperature of rice breeding is (27-30° C.)/(23-25° C.) and the relative humidity of air is 65-85% during the above-mentioned period of raising seedlings and growth management and regulation.

In some embodiments, the harvesting process includes harvesting and threshing mature rice ears, treating them for 5-7 days at air temperature of 28-30° C., air humidity of less than 40% and good ventilation, reducing the moisture content of seeds to 6%-13%, and storing the seeds at low temperature of 0-4° C.

The following is a further description of the regulation of each breeding stage with specific Embodiments.

Embodiment 1

A method of rapid generation-adding breeding of rice includes the following steps:

(1) soaking seeds: the seeds of the rice with full grains are selected and washed with tap water for 2-3 times, and then soaked in deionized water for 12 h.

(2) germination: the soaked seeds are evenly spread in a germination tray covered with wet gauze (10×10×5 cm), 10 mL deionized water is added, and the seeds are cultured at 22° C. for 36 h in the dark.

(3) seedling cultivation: the germinated seeds are sowed into a hole tray with grass carbon as the seedling substrate, and grown in a plant factory under a mixed LED light source with red light (600 nm):blue light (450 nm) of 2:1, with an illumination intensity of 100 μmol m$^{-2}$ s$^{-1}$, the photoperiod of 14 h, the day/night temperature of 27° C./23° C. and the air humidity of 65%.

(4) regulation during vegetative growth period: cultivation is carried out under the conditions of mixed light source with the ratio of red light:blue light:white light of 0.8:0.8:1.0, the photoperiod of 16 h, the illumination intensity of 200 μmol m$^{-2}$ s$^{-1}$, the day and night temperature of 27° C./23° C., the air humidity of 65% and soilless culture technology (Deep Flow Technology, DFT; Aeroponics) of adding Hoagland nutrient solution with 5% of calcium nitrate (Ca(NO$_3$)$_2$).

(5) regulation during heading period: cultivation is carried out under the conditions of mixed light source with the ratio of red light:blue light:white light of 1:0.5:1, photoperiod of 12 h, illumination intensity of 350 μmol m$^{-2}$ s$^{-1}$, day and night temperature of 30° C./23° C., air humidity of 70% and soilless culture technology (Deep Flow Technology, DFT; Aeroponics) of adding Hoagland nutrient solution with 5% of dipotassium hydrogen phosphate (K$_2$HPO$_4$).

(6) regulation during the pustulation period: cultivation is carried out under the conditions of the LED light source with the mixture of red light (660 nm):blue light (450 nm):white light (400 nm) of 1:1:1, the photoperiod of 16 h, the illumination intensity of 500 μmol m$^{-2}$ s$^{-1}$, the day and night temperature of 30° C./23° C., the air humidity of 70% and soilless culture technology (Deep Flow Technology, DFT; Aeroponics) of adding Hoagland nutrient solution with 5% of dipotassium hydrogen phosphate (K$_2$HPO$_4$).

(7) harvesting: the ripe rice ears are harvested and separated, then spread on the non-woven fabric, treated for 5 days at air temperature of 30° C., air humidity of <40% and ventilation; after the water content of seeds is decreased to 6%, the seeds are put into a 100-mesh gauze bag to be stored at a low temperature of 4° C. under dry conditions.

In the above scheme, seedling cultivation in plant factory is carried out 7 days after sowing and heading is carried out 42 days after seedling being planting, while it takes 57 days from rice sowing to harvesting. The yield per unit area of single layer is 0.85 kg, which is equivalent to 566.7 kg per mu (8500.5 kg per hectare).

Embodiment 2

A method of rapid generation-adding breeding of rice includes the following steps:

(1) soaking seeds: the seeds of the rice with full grains are selected and washed with tap water for 2-3 times, and then soaked in deionized water for 20 h.

(2) seedling cultivation: the soaked seeds are evenly spread in a germination tray covered with wet gauze (10×10×5 cm), 10 mL deionized water is added, and the seeds are cultured at 25° C. for 36 h in the dark.

(3) raising seedlings: the germinated seeds are sowed into a hole tray with grass carbon as the seedling substrate, and cultured in a plant factory under a mixed LED (light-emitting diode) light source with red light (600 nm):blue light (450 nm) of 2:1, with an illumination intensity of 100 μmol m$^{-2}$ s$^{-1}$, the photoperiod of 14 h, the day/night temperature of 27° C./23° C. and the air humidity of 70%.

(4) regulation during vegetative growth period: cultivation is carried out under the conditions of mixed light source with the ratio of red light:blue light:white light of 0.8:0.8:1.0, the photoperiod of 16 h, the illumination intensity of 200 μmol m$^{-2}$ s$^{-1}$, the day and night temperature of 27° C./23° C., the air humidity of 65% and soilless culture technology (Deep Flow Technology, DFT; Aeroponics) of adding Hoagland nutrient solution with 5% of calcium nitrate (Ca(NO$_3$)$_2$).

(5) regulation during heading period: cultivation is carried out under the conditions of mixed light source with the ratio of red light:blue light:white light of 1:0.5:1, photoperiod of 12 h, illumination intensity of 350 μmol m$^{-2}$ s$^{-1}$, day and night temperature of 30° C./23° C., air humidity of 70% and soilless culture technology (Deep Flow Technology, DFT; Aeroponics) of adding Hoagland nutrient solution with 5% of dipotassium hydrogen phosphate (K$_2$HPO$_4$).

(6) regulation during the pustulation period: cultivation is carried out under the conditions of the LED light source with the mixture of red light (660 nm):blue light (450 nm):white light (400 nm) of 1:1:1, the photoperiod of 16 h, the illumination intensity of 500 μmol m$^{-2}$ s$^{-1}$, the day and night temperature of 30° C./23° C., the air humidity of 70% and soilless culture technology (Deep Flow Technology, DFT; Aeroponics) of adding Hoagland nutrient solution with 5% of dipotassium hydrogen phosphate (K$_2$HPO$_4$).

After the mature rice ears are harvested and threshed, the seeds are treated for 5-7 days under the condition of air temperature, air humidity <40% and good ventilation, and the moisture content of seeds is reduced to 6%-13% and then stored at low temperature.

(7) harvesting: the ripe rice ears are harvested and separated, then spread on the non-woven fabric, treated for 5 days at air temperature of 30° C., air humidity of <40% and ventilation; after the water content of seeds is reduced to 6%, the seeds are put into a 100-mesh gauze bag to be stored at a low temperature of 4° C. under drying conditions.

In the above scheme, seedling cultivation is carried out 7 days after sowing, and the heading time is carried out 38 days after seedling being transplanted, while it takes 53 days from sowing to harvesting. The yield per unit area of single layer is 1.2 kg, which is equivalent to 702.4 kg per mu (10530 kg per hectare).

Embodiment 3

A method of rapid generation-adding breeding of rice includes the following steps:

(1) soaking seeds: the seeds of the rice with full grains are selected and washed with tap water for 2-3 times, and then soaked in deionized water for 22 h.

(2) germination: the soaked seeds are evenly spread in a germination tray covered with wet gauze (10×10×5 cm), 12 mL deionized water is added, and the seeds are cultured at 22° C. for 48 h in the dark.

(3) seedling cultivation: the germinated seeds are sowed into a hole tray with grass carbon as the seedling substrate, and grown in a plant factory under a mixed LED (light-emitting diode) light source with red light (600 nm):blue light (450 nm) of 3:1, with an illumination intensity of 125 µmol m$^{-2}$ s$^{-1}$ the photoperiod of 18 h, the day/night temperature of 27° C./25° C. and the air humidity of 70%.

(4) regulation during vegetative growth period: cultivation is carried out under the conditions of mixed LED light source with the ratio of red light (660 nm):blue light (450 nm):white light (500 nm) of 1:1:1, the photoperiod of 16 h, the illumination intensity of 250 µmol m$^{-2}$ s$^{-1}$, the day and night temperature of 27° C./25° C., the air humidity of 70% and soilless culture technology (Deep Flow Technology, DFT; Aeroponics) of adding Hoagland nutrient solution with 5% of calcium nitrate (Ca(NO$_3$)$_2$).

(5) regulation during heading period: cultivation is carried out under the conditions of mixed light source with the ratio of red light (660 nm):blue light (450 nm):white light (500 nm) of 1:1:1, photoperiod of 13.5 h, illumination intensity of 400 µmol m$^{-2}$ s$^{-1}$, day and night temperature of 27° C./25° C., air humidity of 70% and soilless culture technology (Deep Flow Technology, DFT; Aeroponics) of adding Hoagland nutrient solution with 5% of dipotassium hydrogen phosphate (K$_2$HPO$_4$).

(6) regulation during the pustulation period: cultivation is carried out under the conditions of the LED light source with the mixture of red light (660 nm):blue light (450 nm):white light (500 nm) of 1:1:1, the photoperiod of 16 h, the illumination intensity of 550 µmol m$^{-2}$ s$^{-1}$, the day and night temperature of 27° C./25° C., the air humidity of 70% and soilless culture technology (Deep Flow Technology, DFT; Aeroponics) of adding Hoagland nutrient solution with 5% of dipotassium hydrogen phosphate (K$_2$HPO$_4$).

After the mature rice ears are harvested and threshed, the seeds are treated for 5-7 days under the condition of air temperature, air humidity <40% and ventilation, and the moisture content of seeds is reduced to 6%-13% and then stored at low temperature.

(7) harvesting: the ripe rice ears are harvested and separated, then spread on the non-woven fabric, treated for 6 days at air temperature of 29° C., air humidity of <40% and ventilation; after the water content of seeds is reduced to 10%, the seeds are put into a 100 mesh gauze bag to be stored at a low temperature of 2° C. under drying conditions.

In the above scheme, seedling cultivation is carried out 7 days after sowing and the heading time is carried out 45 days after seedling being transplanted, while it takes 60 days from rice seeds sowing to harvesting. The yield per unit area of single layer is 0.98 kg, which is equivalent to 653 kg per mu (9795 kg per hectare).

Embodiment 4

A method of rapid generation-adding breeding of rice includes the following steps:

(1) soaking seeds: the seeds of the rice with full grains are selected and washed with tap water for 2-3 times, and then soaked in deionized water for 24 h.

(2) seedling cultivation: the soaked seeds are evenly spread in a germination tray covered with wet gauze (10×10×5 cm), 15 mL deionized water is added, and the seeds are cultured at 25° C. for 36 h in the dark.

(3) seedling cultivation: the germinated seeds are sowed into a hole tray with grass carbon as the seedling substrate, and cultured in a plant factory under a mixed LED (light-emitting diode) light source with red light (600 nm):blue light (450 nm) of 5:1, with an illumination intensity of 100 µmol m$^{-2}$ s$^{-1}$, the photoperiod of 18 h, the day/night temperature of 27° C./25° C. and the air humidity of 70%.

(4) regulation during vegetative growth period: cultivation is carried out under the conditions of mixed LED light source with the ratio of red light (660 nm):blue light (450 nm):white light (700 nm) of 0.8:0.8:1, the photoperiod of 16 h, the illumination intensity of 250 µmol m-2 s-1, the day and night temperature of 27° C./25° C., the air humidity of 70% and soilless culture technology (Deep Flow Technology, DFT; Aeroponics) of adding Hoagland nutrient solution with 5% of calcium nitrate (Ca(NO$_3$)$_2$).

(5) regulation during heading period: cultivation is carried out under the conditions of mixed light source with the ratio of red light (660 nm):blue light (450 nm):white light (700 nm) of 0.5:1:1, photoperiod of 12 h, illumination intensity of 350 µmol m$^{-2}$ s$^{-1}$, day and night temperature of 27° C./25° C., air humidity of 70% and soilless culture technology (Deep Flow Technology, DFT; Aeroponics) of adding Hoagland nutrient solution with 5% of dipotassium hydrogen phosphate (K$_2$HPO$_4$).

(6) regulation during the pustulation period: cultivation is carried out under the conditions of the LED light source with the mixture of red light (660 nm):blue light (450 nm):white light (700 nm) of 1:1:1, the photoperiod of 16 h, the illumination intensity of 500 µmol m$^{-2}$ s$^{-1}$, the day and night temperature of 27° C./25° C., the air humidity of 70% and soilless culture technology (Deep Flow Technology, DFT; Aeroponics) of adding Hoagland nutrient solution with 5% of dipotassium hydrogen phosphate (K$_2$HPO$_4$).

(7) harvesting: the ripe rice ears are harvested and separated, then spread on the non-woven fabric, treated for 5 days at air temperature of 30° C., air humidity of <40% and ventilation; after the water content of seeds is reduced to 13%, the seeds are put into a 100 mesh gauze bag to be stored at a low temperature of 4° C. under drying conditions.

In the above scheme, seedling cultivation is carried out 7 days after sowing and the heading time is carried out 42 days after seedling being transplanted, while it takes 58 days from rice seed sowing to harvesting. The yield per unit area of single layer is 0.81 kg, which is equivalent to 540.3 kg per mu (8104.5 kg per hectare).

Embodiment 5

A method of rapid generation-adding breeding of rice includes the following steps:

(1) soaking seeds: the seeds of the rice with full grains are selected and washed with tap water for 2-3 times, and then soaked in deionized water for 24 h.

(2) germination: the soaked seeds are evenly spread in a germination tray covered with wet gauze (10×10×5 cm), 15 mL deionized water is added, and the seeds are cultured at 25° C. for 48 h in the dark.

(3) seedling cultivation: the germinated seeds are sowed into a hole tray with grass carbon as the seedling substrate, and cultured in a plant factory under a mixed LED (light-emitting diode) light source with red light (600 nm):blue light (450 nm) of 5:1, with an illumination intensity of 150 µmol m$^{-2}$ s$^{-1}$, the photoperiod of 18 h, the day/night temperature of 30° C./25° C. and the air humidity of 85%.

(4) regulation during vegetative growth period: cultivation is carried out under the conditions of mixed LED light source with the ratio of red light (660 nm):blue light (450 nm):white light (700 nm) of 1:1:1, the photoperiod of 18 h, the illumination intensity of 300 µmol m$^{-2}$ s$^{-1}$, the day and night temperature of 30° C./25° C., the air humidity of 85% and soilless culture technology (Deep Flow Technology, DFT; Aeroponics) of adding Hoagland nutrient solution with 10% of calcium nitrate ($Ca(NO_3)_2$).

(5) regulation during heading period: cultivation is carried out under the conditions of mixed light source with the ratio of red light (660 nm):blue light (450 nm):white light (700 nm) of 2:1:1, photoperiod of 13.5 h, illumination intensity of 450 μmol $m^{-2}$ $s^{-1}$, day and night temperature of 30° C./25° C., air humidity of 85% and soilless culture technology (Deep Flow Technology, DFT; Aeroponics) of adding Hoagland nutrient solution with 15% of dipotassium hydrogen phosphate ($K_2HPO_4$).

(6) regulation during the pustulation period: cultivation is carried out under the conditions of the LED light source with the mixture of red light (660 nm):blue light (450 nm):white light (700 nm) of 2:1:1, the photoperiod of 18 h, the illumination intensity of 500 μmol $m^{-2}$ $s^{-1}$, the day and night temperature of 30° C./25° C., the air humidity of 85% and soilless culture technology (Deep Flow Technology, DFT; Aeroponics) of adding Hoagland nutrient solution with 10% of dipotassium hydrogen phosphate ($K_2HPO_4$).

(7) harvesting: the ripe rice ears are harvested and separated, then spread on the non-woven fabric, treated for 7 days at air temperature of 30° C., air humidity of <40% and ventilation; after the water content of seeds is reduced to 13%, the seeds are put into a 100 mesh gauze bag to be stored at a low temperature of 4° C. under drying conditions.

In the above scheme, seedling cultivation is carried out 7 days after sowing and the heading time is carried out 41 days after seedling being transplanted, while it takes 56 days from rice seed sowing to harvesting. The yield per unit area of single layer is 1.08 kg, which is equivalent to 720.04 kg per mu (10800.6 kg per hectare).

In some embodiments, the managing and regulating of the rice at the growth stage can be performed based on a rice breeding management platform, which includes a processor.

In some embodiments, the managing and regulating of the rice at the growth stage may further include that the processor determines one or more target illumination parameters of the target growth period based on the historical growth parameters of the historical growth period and the preset illumination parameters in combination with a machine learning model, and the above process may include the following steps.

S1, the processor acquires historical growth parameters of at least one historical growth period of the seeds of the rice before a target growth period, wherein the target growth period and the at least one historical growth period is at least one of vegetative growth period, heading stage and pustulation period.

The historical growth period may be the growth stage that rice has experienced. The target growth period may be the growth stage that rice is about to enter. For example, if rice is about to enter the heading stage, the vegetative growth period is the historical growth period of the rice, and the target growth period can be either heading stage or pustulation period.

Historical growth parameters refer to the parameters of the growth environment of rice during the historical growth period. In some embodiments, historical growth parameters include historical illumination parameters, historical nutrient solution and its concentration, historical temperature, historical humidity, historical processing time, historical proportion of red, blue and white light, etc.

Historical lighting parameters refer to the parameters related to light environment during the historical growth period of rice. In some embodiments, historical lighting parameters may include historical lighting intensity and historical lighting time.

S2, the processor acquires one or more preset illumination parameters.

The preset illumination parameters refer to one or more preset illumination parameters based on the actual needs of different breeding stages, which can include preset illumination time, preset illumination intensity, etc.

In some embodiments, the preset illumination parameters can be obtained through the input of relevant staff or based on historical breeding data. In some embodiments, the preset lighting parameters can also be obtained in other possible ways.

S3, for each of the one or more preset illumination parameters, the processor determines the predicted growth quality of the seeds of the rice during the target period under the action of the preset illumination parameters based on the illumination prediction model according to the historical growth parameters of the at least one historical growth period and the preset illumination parameters.

The predicted growth quality refers to at least one quality grade related to the growth of rice during the target growth period under the cultivation condition with one or more preset illumination parameters. The preset growth quality can be determined according to leaf areas, a size and a count of rice heads, tiller number, plant height, etc.

In some embodiments, the processor can combine the illumination prediction model to determine the target growth parameters during the target growth period. In some embodiments, the input of the illumination prediction model may include historical growth parameters of at least one historical growth period, for example, preset illumination parameters of the target growth period, at least one historical illumination time and at least one historical illumination intensity corresponding to at least one historical growth period.

In some embodiments, the input of the illumination prediction model may also include the growth morphology images at multiple time points in each of at least one historical growth period, and the nutrient detection results of the nutrient solution at multiple time points in each of at least one historical growth period. Among them, the nutrient detection results of the nutrient solution include the contents of trace elements that are important for rice growth in the nutrient solution, such as nitrogen, phosphorus, potassium and so on. In some embodiments, the nutrient detection results of the nutrient solution can be obtained by manual input or by a nutrient solution nutrient detector.

In some embodiments, the output of the illumination prediction model may include the growth quality of rice during the target growth period. Among them, the growth quality of rice can be expressed by the comprehensive score of growth quality. For example, the comprehensive score is determined according to the indexes such as leaf size, a size and a count of rice heads, tiller number, plant height and weights. The weight of each index can be set manually according to the different cultivation objectives in each growth stage. For example, if the cultivation objective in the vegetative stage is the leaf development of rice seedlings, the leaf areas and the dry weight of the whole seedlings in the vegetative stage will have higher values in determining the growth quality in this stage. For another example, if the cultivation objective during the pustulation period is the growth of rice fruits, the seed numbers and weight per a thousand seeds during the pustulation period will have higher values in determining the growth quality in this stage.

In some embodiments, the type of illumination prediction model may be DNN, CNN, etc.

In some embodiments, the illumination prediction model may include multiple layers. The illumination prediction model can at least include an image feature layer and growth feature layer. The output of the image feature layer may be used as the input of the growth feature layer, and the output of the growth feature layer is the output of the illumination prediction model.

In some embodiments, the image feature layer may be CNN model, the growth feature layer may be RNN model, and they may also be other models that can realize the same processing.

In some embodiments, the image feature layer may process the images of rice and extract image features. The image feature layer may process the input growth morphology image of a certain historical growth period and extract the image features of the growth phenotype.

In some embodiments, the input of the growth feature layer may include historical growth parameters of at least one historical growth period. The historical growth parameters of at least one historical growth period can be expressed by a control parameter matrix m*n. Each row in the matrix is a historical growth parameter feature of a historical growth period, m is the number of historical growth periods, and m can be the preset value of 3, which corresponds to raising seedlings, nutrition and heading period, respectively. If there is no input in a certain stage, the value inside is set to the preset value (For example, 0). N is the feature dimension, and n is determined by the number of features of historical growth parameters. For example, if the historical growth parameters include illumination intensity and illumination time, then n is 2. A certain element in the control parameter matrix is a certain parameter (illumination intensity or time) in a certain stage.

In some embodiments, the input of the growth feature layer further includes the image features of the growth phenotype (growth potential) of at least one historical growth period. The image features of the growth morphology image of at least one historical growth period can be expressed by the matrix t*l. Each matrix corresponds to each historical growth period, t is the number of time points in the historical growth period, and a certain line in the matrix is the image feature at a certain time point, and the dimension of the image feature is l.

In some embodiments, the growth feature layer input also includes the soil detection results of at least one historical growth period. The nutrient solution detection results of at least one historical growth period may be expressed by the matrix m*t, m and t are similar to the above description, and the elements in the matrix are the nutrient solution monitoring data of a certain stage and a certain time point.

In some embodiments, the growth characteristic layer input also includes preset illumination parameters of the target growth period. The preset illumination parameters of the target growth period can be expressed by the vector of vector 1*h. A certain element of the vector is a preset illumination parameter, such as preset illumination intensity.

In some embodiments, the output of the growth characteristic layer is the predicted growth quality of rice at the target growth period.

In some embodiments, the training samples of the illumination prediction model may include the sample historical growth parameters of the sample historical production stage, the sample growth morphology images of the sample historical production stage, the sample nutrient solution detection results of the sample historical production stage, and the sample preset illumination parameters, etc. The label may be the growth quality of the sample growth stage after the historical growth period, and the label may be obtained by manual labeling.

In some embodiments, the sample growth morphology image in the sample historical growth period is input into an image feature model in the illumination prediction model, the sample historical growth parameters, the sample historical growth morphology image. The sample historical nutrient solution detection results, the sample preset illumination parameters and the output results of the image feature model are input into a growth feature model in the illumination prediction model, and a loss function is constructed based on the output and labels of the growth feature model, and the parameters of the image feature model and the growth feature model are iteratively updated simultaneously based on the loss function until the preset conditions are met and the training is completed. After the training, the parameters of the image feature model in the illumination prediction model may also be determined.

The parameters of the image feature model may be obtained by the above-mentioned training method, which is beneficial to solve the problem that it is difficult to obtain labels when training the image feature model alone in some cases, and may also make the image feature model better obtain the rice image features that reflect at least one historical growth period.

In some embodiments, the parameters of the image feature layer in the illumination prediction model can be obtained by training the evaluation model.

The structure of the evaluation model includes image recognition layer and result evaluation layer. The model type of the image recognition layer may be CNN, which is the same as that of the image feature layer in the illumination prediction model. The model type of evaluation layer may be fully connected layer or DNN, etc. The input of the image recognition layer is the growth phenotype image of rice in a certain historical production stage, and the image features of the growth phenotype image are output. The input of the evaluation layer is the image features output by the image recognition layer, and the output is whether the rice is qualified in this historical production stage.

The evaluation model may be trained based on historical data. The training sample includes the image of sample growth morphology in the historical growth period of the sample. The label is whether the rice growth in the sample growth morphology image is qualified or not. Labels may be generated by manual identification.

Compared with the illumination prediction model, the training samples of the evaluation model are easier to obtain. More importantly, the labels of the training samples of the evaluation model are easier to judge manually than those of the illumination prediction model. However, the image feature layer needs a large number of training samples to ensure that the extracted features are accurate enough. By transferring the parameters of the image recognition layer in the evaluation model to the illumination prediction model, the accuracy of model processing can be ensured and the difficulty of sample acquisition can be reduced.

S4, the target illumination parameters of the target growth period are determined according to the at least one predicted growth quality corresponding to the one or more preset illumination parameters.

In some embodiments, the optimal predicted growth quality may be determined according to the ranking of at least one predicted growth quality, and the preset illumination parameters corresponding to the optimal growth quality may be used as the target illumination parameters.

The above-mentioned embodiments only describe the preferred mode of the invention, and do not limit the scope of the invention. Without departing from the design spirit of the invention, all kinds of modifications and improvements made by ordinary technicians in the field to the technical scheme of the invention should fall within the protection scope determined by the claims of the invention.

What is claimed is:

1. A method for rice growth based on the regulation during vegetative growth period of the rice, comprising
soaking seeds of the rice,
germination of the soaked seeds of the rice,
cultivation of the germinated soaked seeds of the rice,
managing and regulating of the rice at a growth stage, and
harvesting the rice, wherein the managing and regulating of the rice at the growth stage includes regulation of dynamic light quality and photoperiod environment during the vegetative growth period of the rice; wherein the regulation of dynamic light quality and photoperiod environment during the vegetative growth period includes: cultivating under the conditions of mixed light source with the ratio of red light:blue light: white light of 0.8-1:0.8-1:1.0, photoperiod of 16-18 h and illumination intensity of 200-300 μmol m$^{-2}$ s$^{-1}$;
wherein the red light has a wavelength of 660 nm, the blue light has a wavelength of 450 nm, and the white light has a wavelength of 400-700 nm;
wherein the managing and regulating of the rice at the growth stage further comprises:
acquiring one or more historical growth parameters of at least one historical growth period of the seeds of the rice before a target growth period, wherein the target growth period is the vegetative growth period and the historical growth parameters at least include historical illumination parameters;
acquiring one or more preset illumination parameters, wherein the one or more preset illumination parameters include preset illumination time and preset illumination intensity;
for each of the one or more preset illumination parameters, according to the historical growth parameters of the at least one historical growth period and the preset illumination parameter, determining a predicted growth quality of the seeds of the rice in the vegetative growth period under the action of the preset illumination parameter based on an illumination prediction model; and
determining one or more target illumination parameters of the vegetative growth period according to the predicted growth quality corresponding to each of the one or more preset illumination parameters.

2. The method of rapid generation-adding growth of rice according to claim 1, wherein the managing and regulating of the rice at the growth stage further comprises:
adding Hoagland nutrient solution with 5%-10% of calcium nitrate during the vegetative growth period.

3. The method of rapid generation-adding growth of rice according to claim 1, wherein the soaking seeds of the rice comprises cleaning the seeds of the rice and soaking them for 12-24 h.

4. The method of rapid generation-adding growth of rice according to claim 1, wherein the germination of the soaked seeds of the rice comprises: culturing the seeds of the rice after soaking in the dark at 22-25° C. for 36-48 h.

5. The method of rapid generation-adding growth of rice according to claim 1, wherein the cultivation of the germinated soaked seeds of the rice comprises: culturing the germinated soaked seeds of the rice under the conditions of mixed light source with the ratio of red light:blue light of 2-5:1, the illumination intensity of 100-150 μmol m$^{-2}$ s$^{-1}$ and photoperiod of 14-18 h.

6. The method of rapid generation-adding growth of rice according to claim 1, wherein during the cultivation of the germinated soaked seeds of the rice and the managing and regulating of the rice at the growth stage, a day/night temperature of the growth of rice is (27-30° C.)/(23-25° C.) and the air relative humidity is 65-85%.

7. The method of rapid generation-adding growth of rice according to claim 1, wherein the harvesting of the rice includes harvesting and threshing mature rice ears, treating them for 5-7 days under the condition of air temperature of 28-30° C., air humidity less than 40% and ventilation, reducing the moisture content of seeds to 6%-13%, and then storing the seeds at low temperature.

8. The method of rapid generation-adding growth of rice according to claim 7, wherein the low temperature is 0-4° C.

* * * * *